(12) United States Patent
Gopalsami et al.

(10) Patent No.: US 8,941,061 B2
(45) Date of Patent: Jan. 27, 2015

(54) COMPRESSIVE PASSIVE MILLIMETER WAVE IMAGER

(75) Inventors: Nachappa Gopalsami, Naperville, IL (US); Shaolin Liao, Willowbrook, IL (US); Thomas W. Elmer, Westmont, IL (US); Eugene R. Koehl, Joliet, IL (US); Alexander Heifetz, Buffalo Grove, IL (US); Apostolos C. Raptis, Downers Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 234 days.

(21) Appl. No.: 13/432,743

(22) Filed: Mar. 28, 2012

(65) Prior Publication Data

US 2013/0257646 A1 Oct. 3, 2013

(51) Int. Cl.
*G01S 13/00* (2006.01)

(52) U.S. Cl.
USPC ................................ 250/336.1

(58) Field of Classification Search
CPC ............................. G01S 13/89; G01K 11/006
USPC ........................................................ 250/336.1
See application file for complete search history.

(56) References Cited

PUBLICATIONS

Appleby, et al., "Millimeter-Wave and Submillimeter-Wave Imaging for Security and Surveillance", Proceedings of the IEEE, Aug. 2007, pp. 1683-1690, vol. 95, No. 8.

Babacan, et al., "Compressive Passive Millimeter-Wave Imaging", 18th IEEE International Conference on imaging Processing, 2011, pp. 2705-2708, Date of conference Sep. 11-14, 2011 doi: 10.1109/ICIP.2011.6116227.
Baraniuk, Richard G., "Compressive Sensing", IEEE Signal Processing Magazine, Jul. 2007, pp. 118-124.
Candès, et al., "Robust Uncertainty Principles: Exact Signal Reconstruction From Highly Incomplete Frequency Information", IEEE Transactions on Information Theory, Feb. 2006, pp. 489-509, vol. 52, No. 2.
Chan, et al., "A Single-Pixel Terahertz Imaging System Based on Compressed Sensing", Applied Physics Letters 93, 121105, 2008, American Institute of Physics.
Donoho, David L., "Compressed Sensing", IEEE Transactions on Information Theory, Apr. 2006, pp. 1289-1306, vol. 52, No. 4.
Duarte, et al., "Single-Pixel Imaging via Compressive Sampling", IEEE Signal Processing Magazine, Mar. 2008, pp. 83-91.
Fetterman, et al., "Simulation, Acquisition and Analysis of Passive Millimeter-Wave Images in Remote Sensing Applications", Optics Express, Dec. 8, 2008, vol. 16, No. 25, pp. 20503-20515.
Gopalsami, et al., "Application for Millimeter-Wave Radiometry for Remote Chemical Detection", IEEE Transactions on Microwave Theory and Techniques, Mar. 2008, pp. 700-709, vol. 56, No. 3.
Gopalsami, et al., "Passive Millimeter Wave Imaging and Spectroscopy System for Terrestrial Remote Sensing", Proc. of SPIE, pp. 767003-1-767003-7, vol. 7670, 2010.
Harwit, et al., "Cyclic S-Matrices", Hadamard Transform Optics, 1970, pp. 208-209, Academic Press, New York.
Jackson, John David, "Introduction to Electrostatics", Classical Electrodynamics, Third Edition, 1998, pp. 46-51.
Lettington, et al., "Passive Millimetre-Wave Imaging Architectures", Institute of Physics Publishing, Journal of Optics A: Pure and Applied Optics, vol. 5, 2003, pp. S103-S110.

(Continued)

*Primary Examiner* — Constantine Hannaher
(74) *Attorney, Agent, or Firm* — Foley & Lardner LLP

(57) ABSTRACT

A compressive scanning approach for millimeter wave imaging and sensing. A Hadamard mask is positioned to receive millimeter waves from an object to be imaged. A subset of the full set of Hadamard acquisitions is sampled. The subset is used to reconstruct an image representing the object.

20 Claims, 15 Drawing Sheets

(56) References Cited

PUBLICATIONS

Liao, et al., "An Efficient Iterative Algorithm for Computation of Scattering from Dielectric Objects", Optics Express, Feb. 14, 2011, pp. 3304-3315, vol. 19, No. 4.

Lynch, et al., "Performance Limitations of Compressive Sensing for Millimeter Wave Imaging", Proc. of SPIE, pp. 76700D-1-76700D-8, vol. 7670, (Apr. 27, 2010).

Stephen, J.B., "Techniques of Coded Aperture Imaging for Gamma-Ray Astronomy", Adv. Space Res., pp. (8)407-(8)418, 1991, vol. 11, No. 8.

Yujiri, et al., "Passive Millimeter-Wave Imaging", IEEE Microwave Magazine, Sep. 2003, pp. 39-50.

COMPRESSIVE PASSIVE MILLIMETER WAVE IMAGER

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates to passive millimeter wave imaging. Specifically, the present invention relates to compressive passive millimeter wave imaging.

BACKGROUND OF THE INVENTION

Passive millimeter wave (MMW) imaging has many applications such as remote sensing of the Earth's resources, aircraft landing in optically obscure weather, and security point inspection of concealed weapons in humans. The underlying principle is the measurement of Planck's blackbody radiation of materials at millimeter wavelengths. The main advantage of passive MMW imaging is that it provides information about ground-based targets under all weather conditions; optical systems (visible and IR), on the other hand, require clear atmospheric conditions for reliable operation. For example, the atmospheric attenuation at MMW frequencies is 0.07 to 3 dB/km in drizzle and fog, whereas it is one to three orders of magnitude higher at optical frequencies (exceeding 100 dB/km in foggy conditions). (See, e.g., L. Yujiri, M. Shoucri, and P. Moffa, "Passive millimeter-wave imaging," IEEE Microwave Magazine, September (2003); R. Appleby and R. N. Anderton, "Millimeter-wave and submillimeter-wave imaging for security and surveillance," Proc. IEEE, 95, 1683-1690 (2007); A. H. Lettington, D. Dunn, M. Attia, and I. M. Blankson, "Passive millimeter-wave imaging architectures," J. Optics A: Pure and Applied Optics, 5, S103-S110 (2003)). Excellent image contrast is obtained in outdoor environments due to cold sky-reflected radiation by targets. For example, the apparent temperature of the sky at 94 GHz is 70K in comparison to 220K at infrared wavelengths. Even at the same ambient temperature, there exists variation in MMW thermal contrast of objects because of emissivity differences of objects at these wavelengths, e.g., the emissivity of metal is ≈0, water 0.4, wood 0.4, and concrete 0.8. (M. R. Fetterman, J. Grata, G. Jubic, W. L. Kiser, Jr., and A. Visnansky, "Simulation, acquisition, and analysis of passive millimeter-wave images in remote sensing applications," Optics Express, 16, 20503-20515 (2008).) As a result, signal "washouts" do not occur because the apparent temperature between the background and the object are rarely similar.

In addition to imaging, passive millimeter waves can be used to obtain spectroscopic signatures of chemicals based on molecular rotational energy transitions. With a 16-channel filter bank in the 146-154 GHz band, the 150 GHz spectral line of nitric oxide from a test stack at a distance of 600 m from the radiometer has been measured. (N. Gopalsami, S. Bakhtiari, T. W. Elmer, and A. C. Raptis, "Application of Millimeter-Wave Radiometry for Remote Chemical Detection," IEEE Trans. on Microwave Theory and Techniques, 56, 700-709 (2008)). While imaging can provide broad area search of facilities for certain observables such as structural changes, traffic, and effluent heat, the spectroscopy system can provide more specific signatures of effluent chemicals from exhaust stacks. Millimeter wave radiation allows for rotational spectroscopy of polar molecules, so it can provide fingerprint signatures of chemicals emanating from material processing facilities. FIG. 1 is an example of an outdoor image that was obtained with a prior system.

A major disadvantage of such a single-pixel detector system is the long scanning time for image acquisition. For example, a 100×100 pixel image with 1 s integration time per pixel requires a minimum of 2 h 47 min. With such a long imaging time, the imager's value is diminished for applications involving imaging of nonstationary objects or for real-time or near real-time applications. Stemming from the need for faster imaging, there has evolved the concept of compressive sensing which has the potential in reducing the image acquisition time by a factor of 10 or more.

SUMMARY OF THE INVENTION

One embodiment of the invention relates to a method for millimeter-wave imaging. A portion of an extended Hadamard mask is positioned. The extended Hadamard mask is within an opening of a template with an opening of size p×q, the extended Hadamard mask having a size (2p−1)×(2q−1) wherein p and q are prime numbers, the Hadamard mask receiving millimeter waves from a source. A portion of the millimeter waves are transmitted through transmit pixels in the Hadamark mask. A portion of the millimeter waves are reflected by reflect pixels in the Hadamark mask. The transmitted portion of the millimeter waves are focused and these focused millimeter waves are received by a detector Another embodiment relates to a system for passive millimeter wave imaging a source, the system having an extended Hadamard mask comprises a plurality of pixels, the pixels including transmitting pixels and non-transmitting pixels, the transmitting pixels allowing millimeter waves to pass through. The system further including a template with an opening smaller than the extended Hadamard mask, the template is positioned between the source and the extended Hadamard mask. A focusing lens is positioned behind the extended Hadamard mask relative to the source and positioned to receive millimeter waves from the extended Hadamard mask. A receiving antenna is associated with the focusing lens to receive millimeter waves. A radiometer is in communication with the receiving antenna.

Another embodiment relates to a computer-implemented machine for imaging an object, comprising a processor, and a tangible computer-readable medium operatively connected to the processor and including computer code. The computer code is configured to control imaging an object via an imaging lens at an image plane. The computer code positioning a Hadamard mask at the image plane. The computer code is further configured to control interacting millimeter waves from the object with the Hadamark mask. The computer code is further configured to control transmitting a portion of the millimeter waves through transmit pixels in the Hadamark mask. The computer code is further configured to control focusing the transmitted portion of the millimeter waves. The computer code receiving the focused millimeter waves.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE PREFERRED EMBODIMENTS

Figure 1:
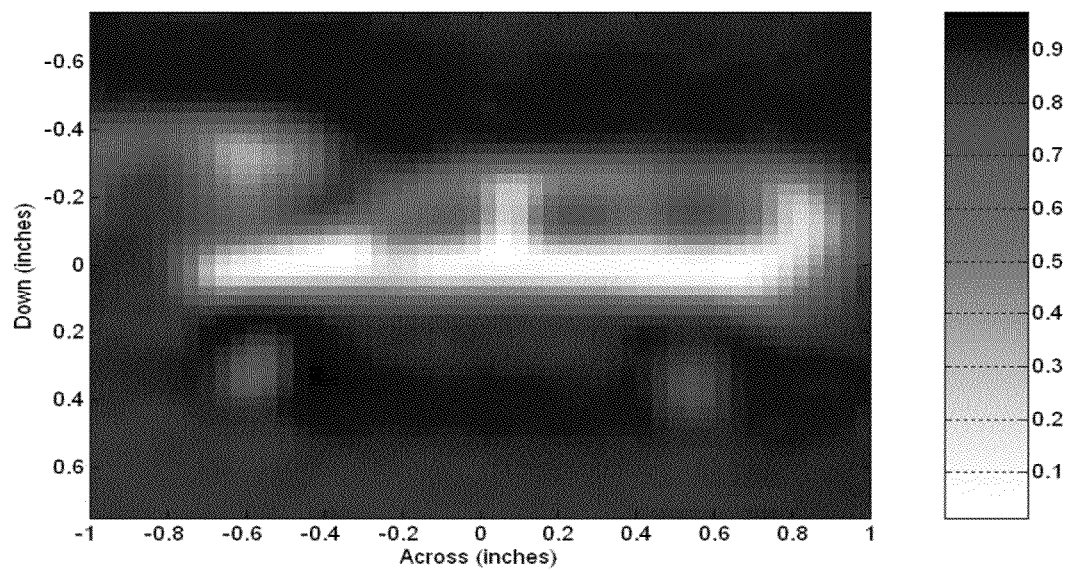
FIG. 1 illustrates a Passive MMW image of an outdoor scene consisting of an SUV parked in front of a dumpster.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A serious drawback of single-pixel passive millimeter wave (PMMW) imaging and spectroscopy system is the long acquisition time needed to produce a high-fidelity image, arising from two factors: (a) the time to scan the whole scene pixel by pixel and (b) the integration time for each pixel for adequate signal to noise ratio (SNR). Compressive sensing (CS) has been developed for single pixel optical cameras. CS reduces the time necessary for imaging while still producing high-fidelity images by exploiting the sparsity of the data in the image space. Although the efficacy of CS for optical cameras has been proven, its application to PMMW systems is not straightforward. PMMW systems differ from the typical optical camera system in at least two important ways. First, PMMW systems involve longer wavelengths by three to four orders of magnitude. The longer wavelengths cause high diffraction and insertion losses in finite size spatial waveform modulators. Second, PMMW systems involve weaker radiation intensity, often several orders of magnitude difference. The present invention relates to systems and method for utilizing a CS technique for PMMW imagers.

CS takes advantage of the sparsity or compressibility of an image in a domain such that fewer samples can be taken to achieve the image than required for conventional imaging; yet the CS derived image can be nearly exactly reconstructed with minimal loss of information in comparison to convention imaging. Some existing compression mechanisms rely upon bandwidth compression to achieve reduced data size for an image, for example JPEG. In contrast, CS techniques exploit compression in signal/image structure and collect fewer data, thus saving on imaging time.

Mathematically, an image of size p×q can be represented by a vector x(i), i=1, 2, . . . , N where N=p×q. If x is sparse or compressible in some basis $\Psi$ resulting from the concatenation of basis functions $\psi_i$, i=1, . . . N, the vector x may be represented as $$x = \sum_{i=1}^{N} \alpha_i \psi_1 \qquad (1)$$

where $\alpha_i = 0$ or $\approx 0$ for $i > M$ and $M << N$

This is generally true in most imaging scenarios. In this case, it is possible to design a sampling matrix $\Phi$ that operates on x to provide y(i), i=1, . . . , M measurements. The transformation between x and y is represented by $$y = \Phi x = \Phi \Psi \alpha = \Theta \alpha, \qquad (2)$$

where $\Phi$ and $\Theta$ are M×N matrices.

For the sampling matrix it is necessary to choose M samples or the $\Phi$ matrix such that the image x can be reconstructed from y with minimal or no loss of information. The acquisition matrix $\Phi$ must satisfy the mathematical requirement of restricted isometry property (RIP). Generally speaking, RIP implies that the rows of $\Phi$ and the columns of $\Omega$ in (2) must be incoherent. In one embodiment, the RIP and coherence requirements can be satisfied by simply selecting $\Phi$ as a random matrix, independent of $\Psi$ or x. An example of an $\Phi$ matrix is a series of M random masks each having a size p×q that modulates the scene to provide M projections of the scene that constitute the CS measurements. In one embodiment, each pixel in the series of M random masks is either transmitting ("1") or blocking ("0").

The image reconstruction is generally posed as an $l_1$ norm optimization problem:

$$\alpha = \text{argmin} \|\alpha'\|_1 \text{ such that } \Theta \alpha' = y \qquad (3)$$

If the signal is K sparse (i.e., $\alpha_i = 0$ for i>K), then the algorithm can exactly recover the signal using only $$M \geq cK \log\left(\frac{N}{K}\right)$$

measurements, where c is a small constant.

Although CS has been applied to optical systems, the apparatus and methods for such systems does not extend to PMMW applications. CS for optical systems has utilized digital micromirror devices (DMD) which simulate random masks by changing their reflection angles electronically to achieve either a transmitting or blocking for a pixel. As mentioned earlier, the CS implementation at millimeter wavelengths is not straightforward, i.e., there are no suitable spatial intensity modulators such as DMDs for these wavelengths. Implementation of compressive sampling in MMW imagers entails the following steps:

Design and fabrication of masks with suitable pixel resolution;

Design and implementation of lens optics to expand the image plane so that spatial intensity; modulating masks of reasonable size can be introduced into the imager setup;

Development of image acquisition and reconstruction software; and

Validation of the imaging technique with calibration/benchmark targets.

Design and Fabrication of Spatial Intensity Modulator Masks

Reflective or transmissive printed circuit elements (PCE) on a MMW transparent plastic sheet may be utilized. In one embodiment, the PCE are patterned arbitrarily. However, this approach is not practical in passive MMW imagers. The manual use of masks is insufficient for the speed necessary to achieve the desired fast imaging by CS. In addition, the optical components in passive systems must be carefully designed to avoid excessive insertion or diffraction loss by the masks since passive MMW radiation is of inherently very low power.

Figure 2A:
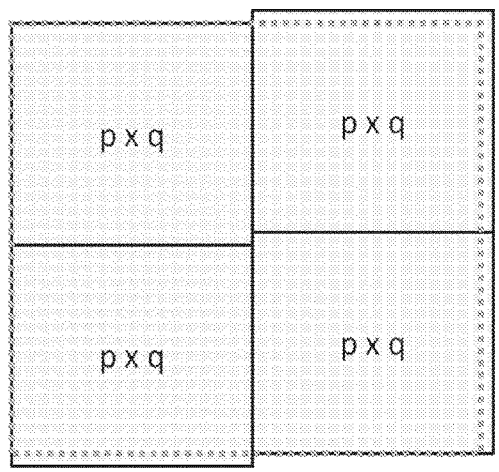
FIGS. 2A and 2B illustrate an extended Hadamard mask of size 81×85 pixel: (a) layout and (b) fabricated on a quartz plate with chrome coating. A 41×43 pixel mask area is exposed for each acquisition.
Figure 2B:
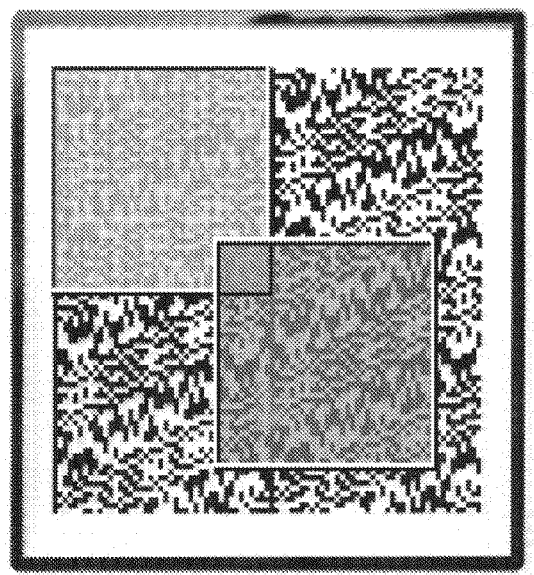

Thus, in one embodiment of the invention, a single extended mask is utilized to scan a scene rather than M random masks, one at a time. In one embodiment, the size of the extended Hadamard mask is determined by the twin prime construction method in Hadamard transform theory: for an image size of p×q, where p and q are prime numbers, the size of the extended mask is (2p−1)×(2q−1). See, M. Harwit and N. Sloane, *Hadamard Transform Optics*, Academic Press, New York (1979), incorporated herein by reference. The sample area is determined by positioning the extended Hadamard mask against a template with an opening of size p×q. A cyclic S matrix of size pq×pq, where p and q are prime numbers, and q=p+2, is obtained with twin prime construction procedure by folding the elements of the first row of the S-matrix into a p×q matrix. The p×q matrix is periodically repeated to form a (2p−1)×(2q−1) extended matrix as shown in FIG. 2(A). FIG. 2(B) is the fabricated mask made of chrome on quartz, in which the blue and red rectangles show examples of two mask positions for data acquisition. If the extended mask is scanned in a raster pattern behind a template with an opening of size p×q, N (=pq) different mask patterns are exposed for a full set of data collection. One may randomly choose M p×q submasks out of the (2p−1)×(2q−1) extended mask for compressive data collection.

For one embodiment, the design of mask is based on the following considerations:

Pixel size s>λ/2 to reduce diffraction losses by subwavelength size holes, (where λ=2 mm is the wavelength of millimeter waves at 150 GHz)

The mask size ps×qs should match the MMW image plane at the mask location

The image pixels>40×40 for adequate image resolution p and q with q=p+2 are prime numbers for cyclic S matrix generation In one embodiment, p=41 and q=43 with a pixel size of 1.24 mm and produced an extended cyclic mask of 81×85 pixels of size 10.04 cm×10.53 cm. Each p×q mask is of size 50.84 mm×53.32 mm. The extended mask was fabricated using chrome coating on a millimeter-wave transparent quartz plate, as shown in FIG. 2(B).

Compressive Sensing MMW Imager

In one embodiment, a device in accordance with the present invention operates as follows. An imaging lens (the first lens behind the object) produces an image of the object at its image plane according to lens equation ($1/f_r=1/d_i+1/d_o$). A Hadamard mask pattern consisting of transmit/reflect pixels is introduced at the image plane. The Hadamard mask patterns of given size are predetermined by the Hadamard transform theory. The radiation from the image plane is modulated (transmitted through or reflected away) by the Hadamard mask pattern and the transmitted radiation is refocused by a second lens (focusing lens) onto the radiometer antenna. Essentially with this process the 2-D image is converted into a single data point in the Hadamard transform domain. Many such data points, but fewer than the total number required for conventional imaging, are collected by randomly introducing a different Hadamard mask pattern each time. The original image may be faithfully reconstructed from the compressively sampled data using a known iterative reconstruction algorithm. It should be appreciated that while the examples described below illustrate embodiments for detection of passive millimeter waves, the present invention may be applied to active millimeter wave systems and methods as well.

Setup

Figure 3:
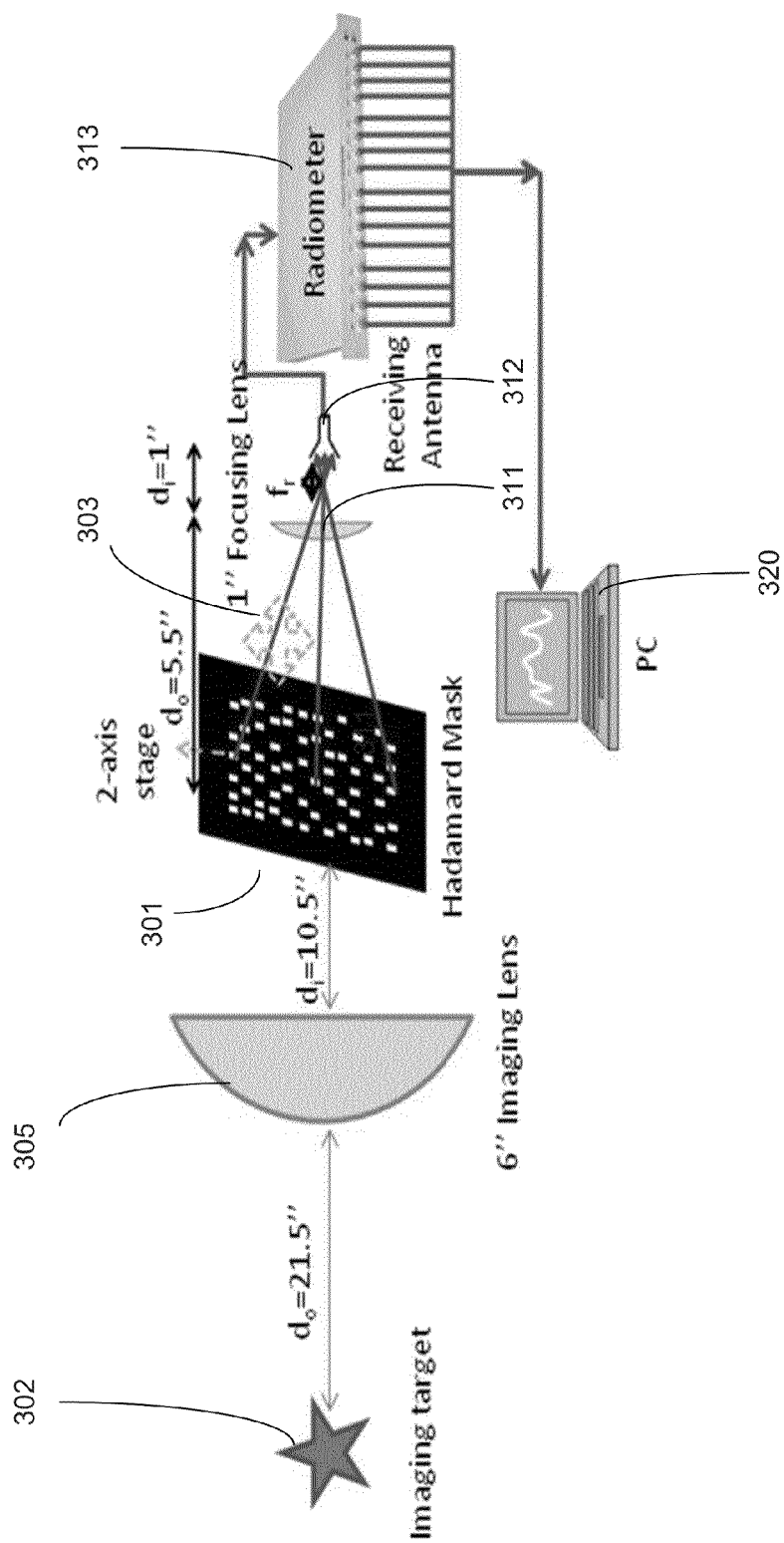
FIG. 3 illustrates one embodiment of a compressive sensing setup for passive MMW imaging.

Traditional imagers utilize a radiometer placed at the focal plane of a 15.24 cm lens. The lens is then raster-scanned to form an image. In one embodiment, CS techniques of the present invention require masks to be inserted at the image plane of the lens for spatial intensity modulation. Therefore, the CS techniques, in certain embodiments, require an additional lens to collect the modulated radiation and focus it into the radiometer horn. FIG. 3 shows such a two-lens PMMW setup for CS implementation using Hadamard masks. The extended Hadamard mask 301 is placed at the image plane of the first lens 305, and a metal plate 304 with a hole of size p×q, placed in front of the mask, defines the exposure window. The object 302, i.e. the imaging target, is positioned on the opposite side of the imaging lens 305 from the Hadamard mask 301. The extended mask 301 is controlled by a 2-axis translation stage 303 to expose different mask patterns for compressive data collection, one for each measurement. A second lens 311 of one inch diameter collects the modulated radiation field through the Hadamard mask 301, and focuses it to a receiving antenna 312 that is in communication with a multichannel radiometer 313. It should be appreciated that the positions of the lenses 305, 311 and the mask 301 are governed by the lens equation: $1/f_r=1/d_i+1/d_o$, where $f_r$ is the focal length of either of the lenses 305, 311, $d_i$ and $d_o$ are the image and object distances, respectively. For purposes of the example, because the targets used in the experiments did not have spectral features, all the spectral channels were averaged to increase the signal-to-noise ratio ("SNR"). The multichannel radiometer 313 is in communication with a processor, such as a personal computer 320, to process and store the information from the multichannel radiometer 313.

Image Reconstruction for Full Hadamard Acquisitions

If a complete set of N acquisitions is made by raster-scanning the extended Hadamard mask pixel by pixel, the image reconstruction consists of simple matrix manipulations as shown below. The measured intensity vector $I_m$ by the cyclic Hadamard mask may be expressed as $$I_m = S I_s \quad (4)$$

where S (pq×pq) is the cyclic S-matrix realized by the Hadamard mask and $I_s$ (pq×1) is the scene intensity vector, which can be reconstructed from the full set of Hadamard measurements by $$I_s = S^{-1} I_m. \quad (5)$$

For a given size Hadamard mask, the S matrix in Eq. (5) is predetermined from the Hadamard sequence, so the image reconstruction is very fast.

Imaging Results for Complete Acquisitions

Figure 4:
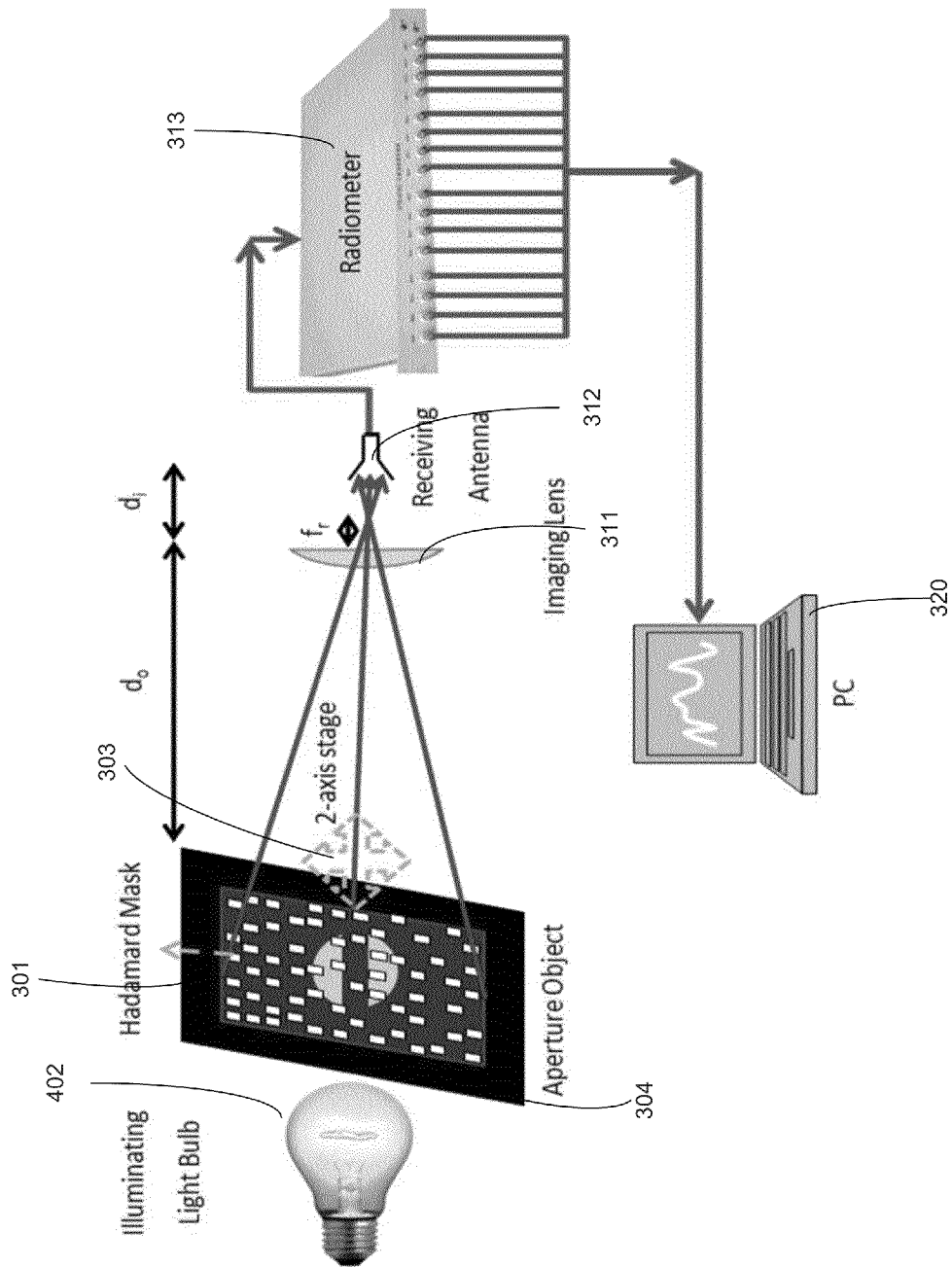
FIG. 4 illustrates a proof-of-principle setup for one embodiment with a thermal light source illuminating an object consisting of a 2.54 cm diameter circular hole with a 3 mm wide rectangular metal strip.
Figure 5A:
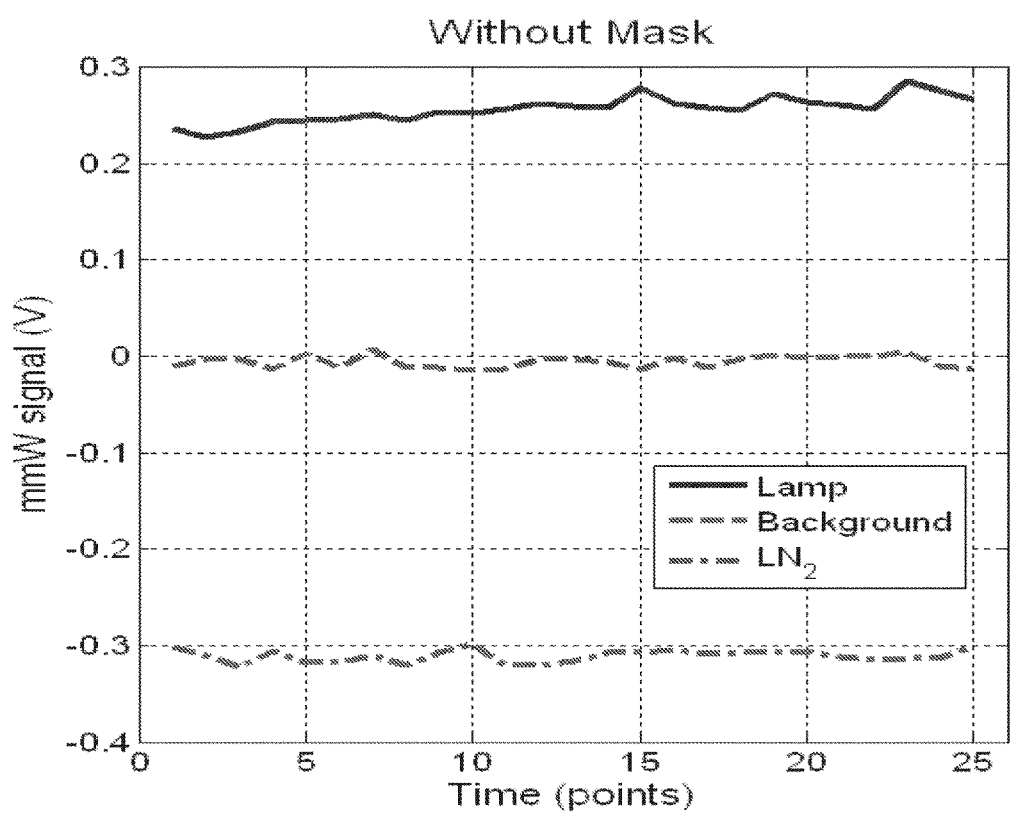
FIGS. 5A-5C are graphs of signal-to-noise ratios with and without the Hadamard mask: radiometer signals for different backgrounds: (a) without, and (b) with the mask; (c) lamp brightness temperature without and with the mask. The transmission through mask assumes 50% of the pixels are blocked, and SNR is defined as $\mu_{\Delta T}/\sigma$.
Figure 5B:
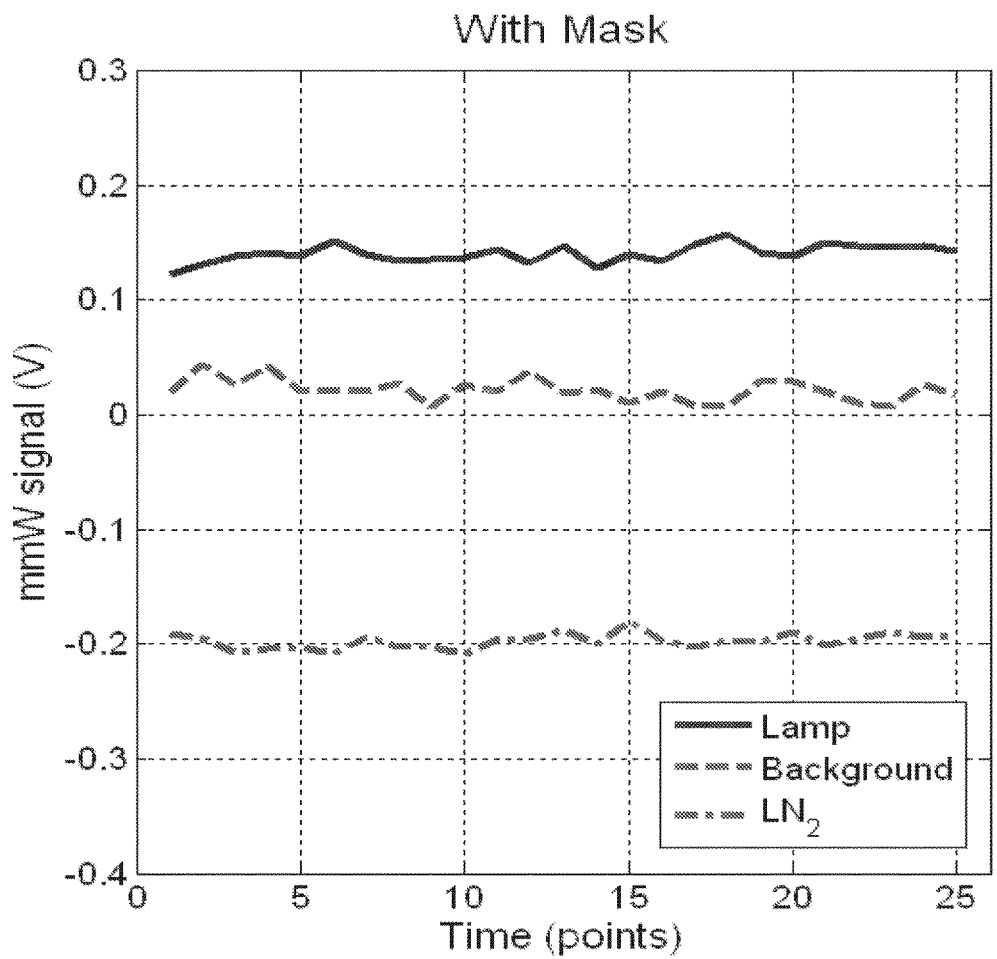
Figure 5C:
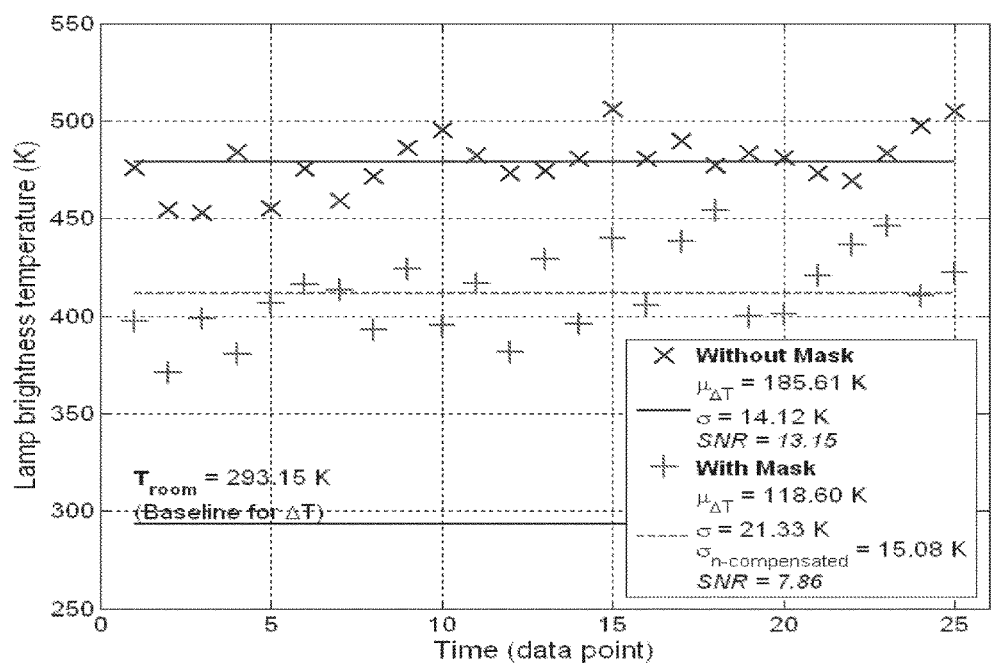

To analyze the effect of masks on the SNR, a simple setup consisting of a single 1-inch diameter lens collecting the radiation from the mask, as shown in FIG. 4 (without the 6-inch lens), was utilized. Although the MMW transmission through individual pixels in the mask 301 suffers from small pixel sizes relative to the wavelength ratio, the overall transmission as used in this setup is not affected significantly as the signals from nearly half of the open mask pixels are summed up by the detector. The radiometer 313 signals were first measured for three backgrounds: a 60 W incandescent lamp 402, a liquid nitrogen load, and an absorber at ambient temperature. FIGS. 5(a) and 5(b) give, respectively, the radiometer signals without and with the mask in the beam path. The brightness temperature of the lamp as calibrated with liquid nitrogen and ambient loads is about 475K. The SNR values of the radiometer for the lamp radiation without and with the mask in the beam path are 13.2 and 7.9, respectively (see FIG. 5(c)). A factor-of-2 reduction in SNR is a tradeoff for higher image resolution achieved with subwavelength pixel size. The transmission through mask assumes 50% of the pixels are blocked, and SNR is defined as $\mu_{\Delta T}/\sigma$.

Figure 6B:
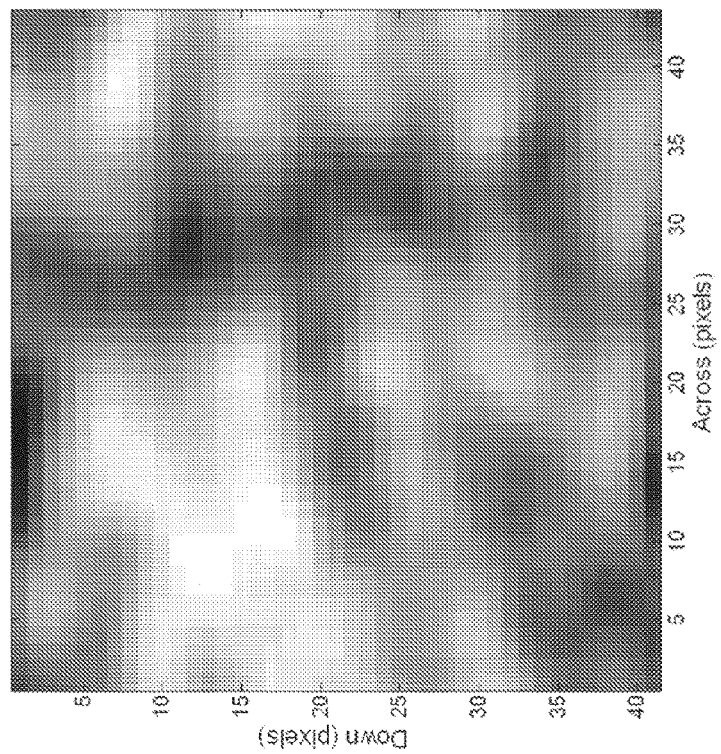
FIGS. 6A and 6B illustrate a simulation of target geometry: (a) digitized image of circular hole with a strip in the middle, and (b) a simulated Hadamard transformed image.
Figure 6A:
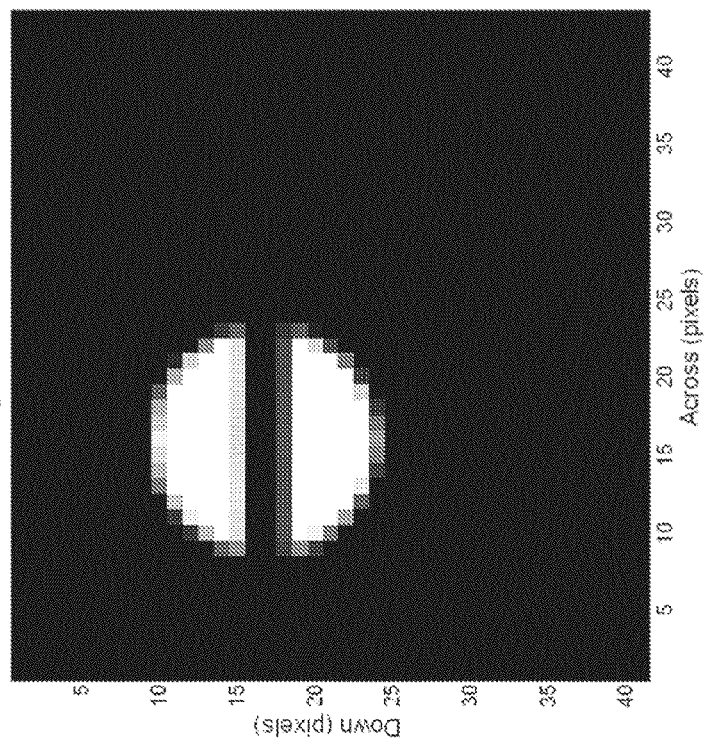

To test image formation and reconstruction, the simplified imaging setup in FIG. 4 was used with a light bulb 402 (thermal light source) illuminating an object 302 consisting of 2.54 cm circular hole with a 3 mm wide metal strip in the middle, and with the Hadamard mask 301 situated behind the object 302 in close proximity. The Hadamard transform and image reconstruction process was first simulated for the object geometry. FIG. 6(a) gives the binary coded image of the object with '1' representing the hole and '0' the metal portion, and FIG. 6(b) is its Hadamard transformed image according to Eq. 4. The reconstructed image from Hadamard transformed data using Eq. (5) was exact and identical to FIG. 5(a) for this case.

Figure 7B:
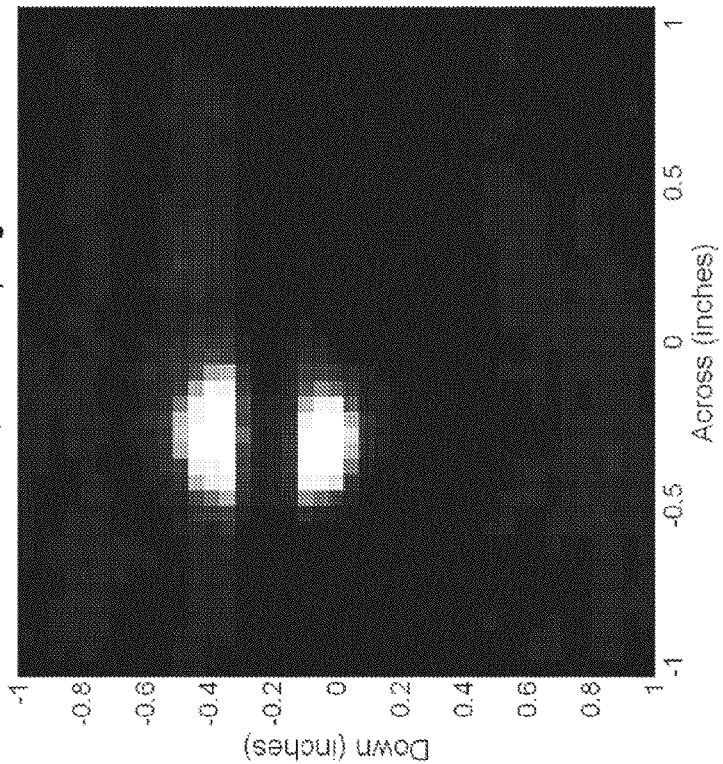
FIGS. 7A and 7B illustrate observed experimental data: (a) Hadamard-transformed image and (b) Reconstructed image.
Figure 7A:
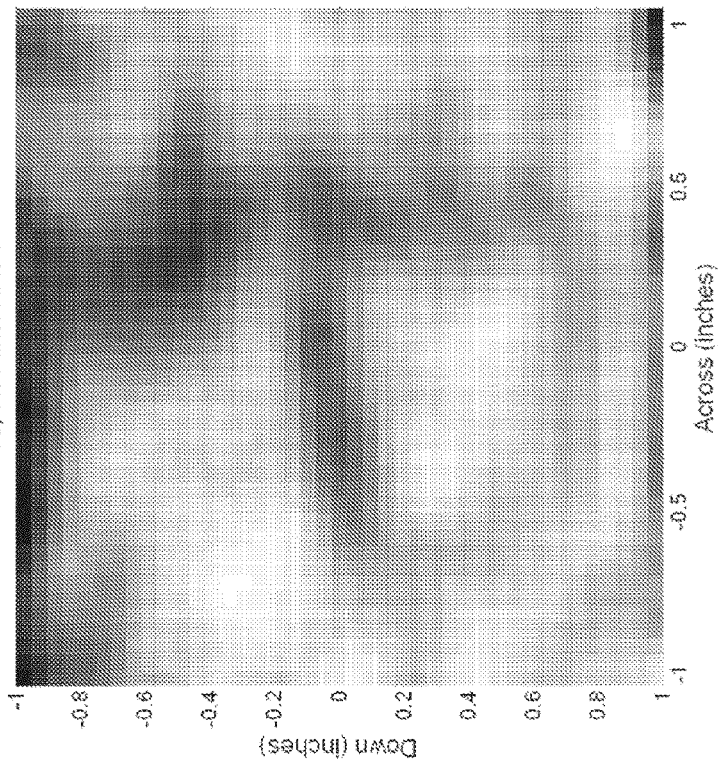

Next obtained a full set of pq=1763 Hadamard acquisitions were obtained by raster scanning the Hadamard mask. FIG. 7(a) gives the Hadamard transformed image, and FIG. 7(b) shows the reconstructed image. An excellent agreement is seen between the simulated (FIG. 6(b)) and experimental, fully acquisition, (FIG. 7(a)) Hadamard transformed images. The reconstructed image of a circular hole with a horizontal metal strip shows the feasibility of Hadamard imaging at millimeter wavelengths with subwavelength resolution (1.24 mm pixel size for 2 mm wavelength).

Compressive Sensing and Image Reconstruction

To get the full set of Hadamard acquisitions, such as seen in FIG. 7A, the extended mask was scanned one pixel at a time, along q pixels in the horizontal and p pixels in the vertical directions. However, in accordance with embodiments of the invention, the number of acquisitions can be reduced several ways. For example, the mask may be sampled randomly or sequentially every $n^{th}$ pixel in the horizontal and vertical directions. These reduced acquisitions represents sub-sampled data set in the Hadamard transform space. To reconstruct the image, the missing data in the Hadamard space may be calculated with a numerical procedure. In one embodiment, using the $n^{th}$ sequential pixel approach, the relaxation method, which is frequently used in 2D solution of Poisson equation in electrostatics, was utilized. (See, e.g., J. D. Jackson, *Classical Electrodynamics*, Wiley, New York (1998)). The relaxation method is an iterative scheme, where a trial value at a missing pixel may be obtained as a weighted average of the values at the neighboring pixels. The iterative procedure continues until the predicted values converge to within some tolerance limit. One of ordinary skill will appreciate that the tolerance limit may be set depending on the desired degree of accuracy of reproduction of the image. Once the missing pixel values are calculated, the reconstruction equation in Eq. (5) may be used for image recovery.

Figure 8A:
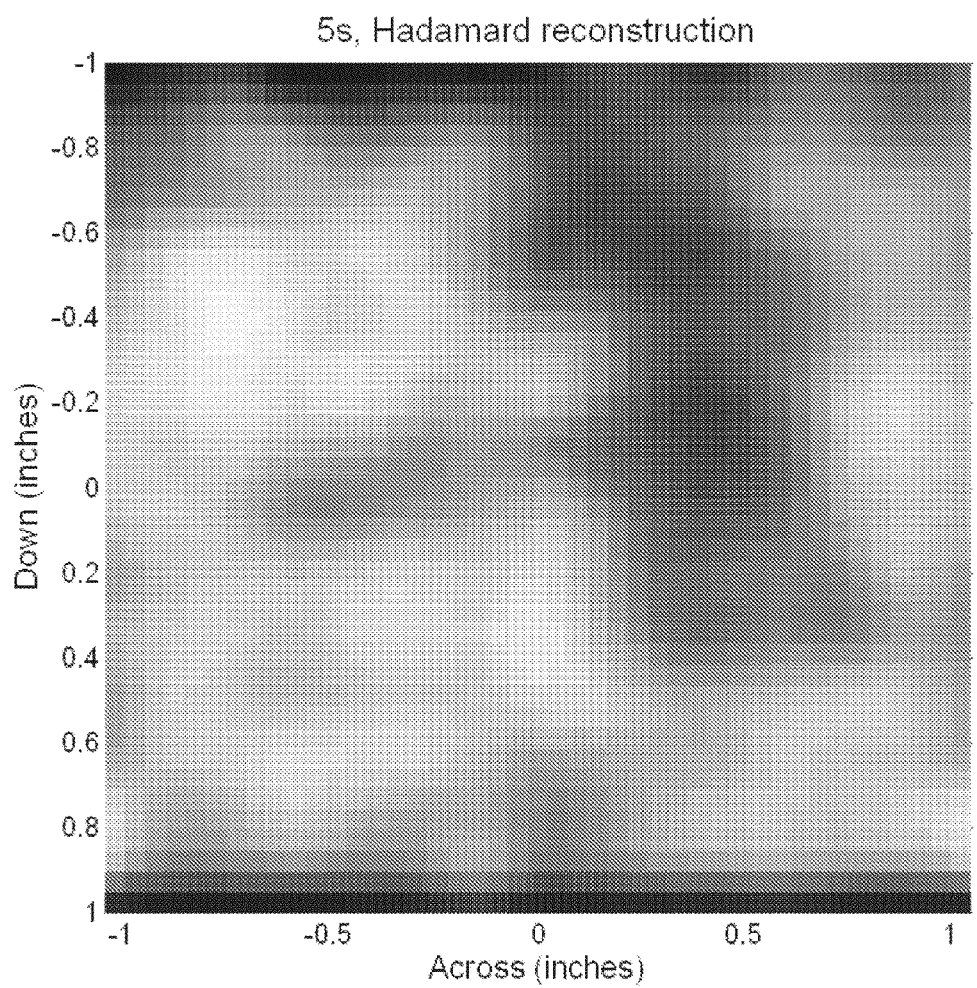
FIGS. 8A and 8B illustrate reconstructed image using $1/8^{th}$ sampling: (a) relaxation method-based reconstruction of Hadamard space, and (b) reconstructed image.
Figure 8B:
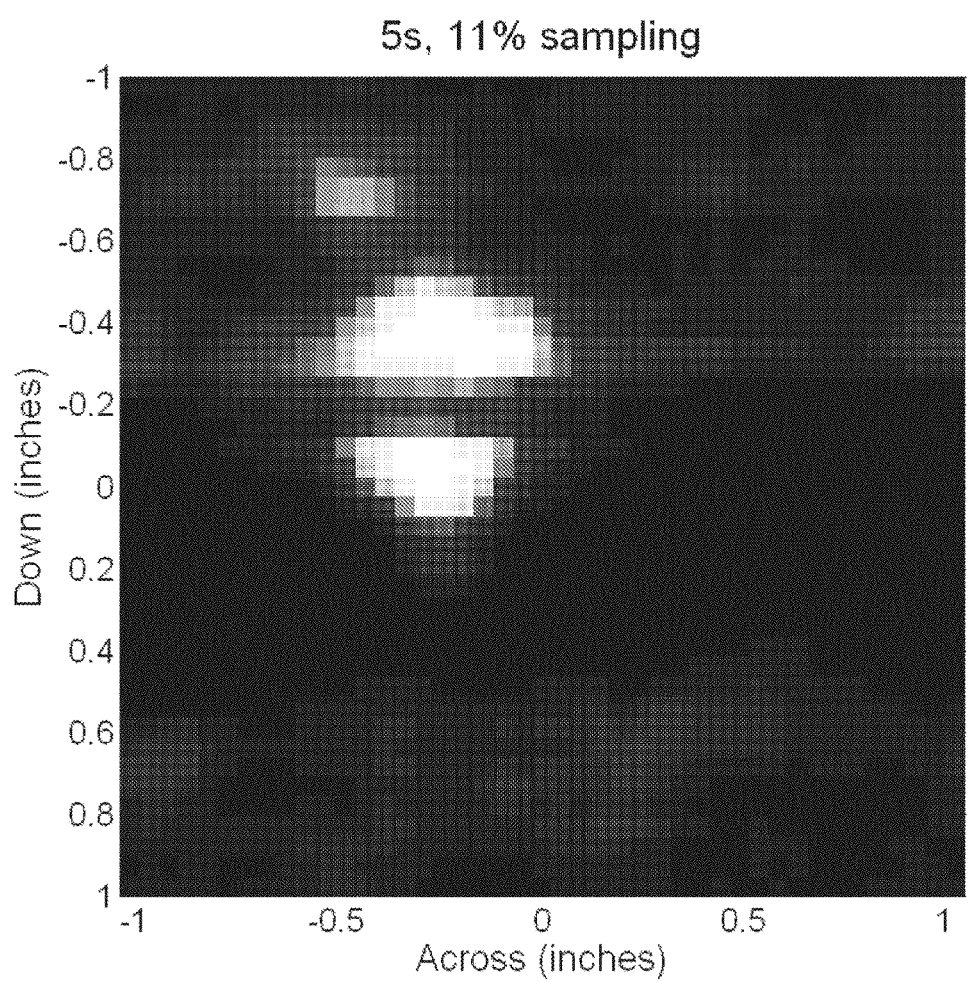

To test the relaxation technique, every $3^{rd}$ column and $3^{rd}$ row of the Hadamard space was sampled, providing ⅑ of a full acquisition. FIG. 8(a) gives the recovered image in the Hadamard space, and FIG. 8(b) shows the reconstructed image of the object. The recovered Hadamard image (FIG. 8(a)) from partial data compares well with the full Hadamard image in FIG. 7(a). Also, the reconstructed image of the object clearly shows the circular hole with a strip in the middle. Thus, the image reconstructed from ⅑$^{th}$ of the acquisitions compares favorably with a full acquisition image.

Progressive Compressive Sensing and Real-Time Image Reconstruction

Embodiments of the present invention provide a progressive sampling and image reconstruction method in which the Hadamard acquisition starts at every $n^{th}$ row and $n^{th}$ column in the Hadamard space. The relaxation technique is applied to fill the Hadamard space from which the image is reconstructed after every sample in real time by Eq. 5, since the S matrix is predetermined for given p and q. However, the error in reconstruction will be less after each complete pass (N/n samples) as shown by the circles in FIG. 9. The complete image acquisition and reconstruction software for the examples described herein was implemented in LabVIEW®. If the image is not satisfactory, then the Hadamard space in between the sampled points is continued to be sampled and reconstructed with (2N/n) data, and so on. The sample space is progressively increased until satisfactory image quality is obtained. In one embodiment, samples are collected until a user recognizes the imaged object. In another embodiment, the sampling continues until 25% of the total possible samples have been collected.

The reconstructed image quality using the progressive sampling method was compared against the Bayesian random sampling method. A normalized mean squared error (NMSE) metric was adopted for comparison of reconstructed images from partial and full set of samples. NMSE is $$\frac{\sum_{i=1}^{N}(I_p(i)-I_f(i))^2}{\sum_{i=1}^{N}(I_f(i))^2}$$

where $I_p(i)$ and $I_f(i)$ are the intensities of the $i^{th}$ pixel corresponding to the reconstructed images from partial and full acquisitions, respectively.

Figure 9:
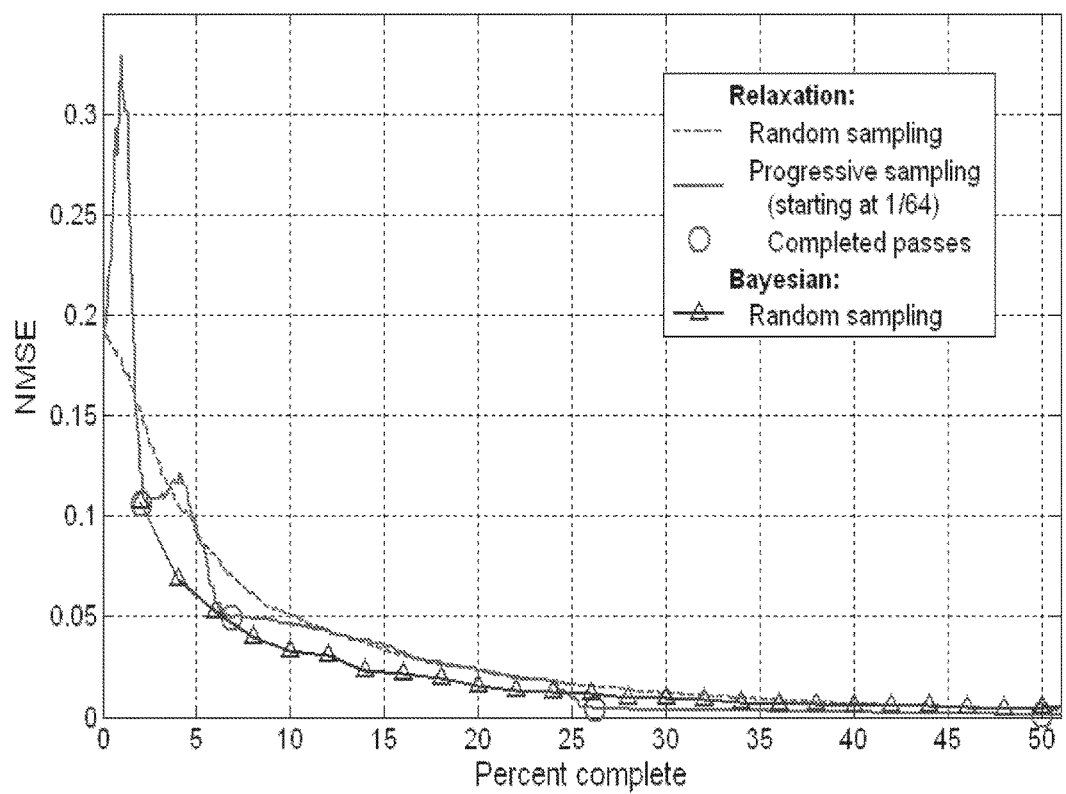
FIG. 9 is a graph comparing normalized mean square error (MSE) for progressive sampling and conventional random sampling methods.

FIG. 9 provides the comparison of NMSE versus the percent completion of the full acquisitions. The progressive sampling in this case started at 1/64 of the samples, and the reconstructed image obtained after every complete cycle (e.g., 1/32, 1/16, . . . , 1) showed comparable or better performance than the random sampling methods. In addition, the computational time of the Hadamard transform-based reconstruction is significantly less than that of the conventional random sampling algorithm which employs Bayesian reconstruction methods.

Far Field Imaging with Two Lens Setup

Figure 10A:
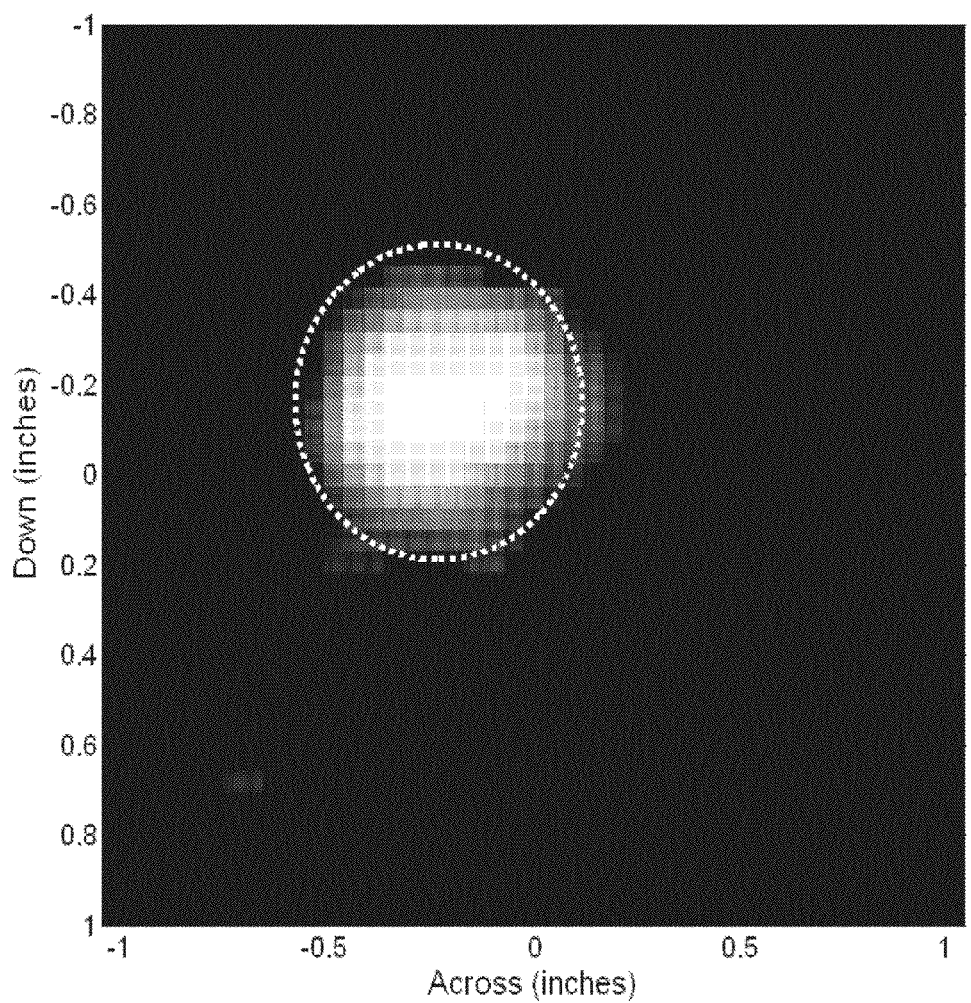
FIGS. 10A and 10B illustrate Hadamard transform based images of lamp (a) without blocking, and (b) with one quarter of the lamp blocked by a metal plate.
Figure 10B:
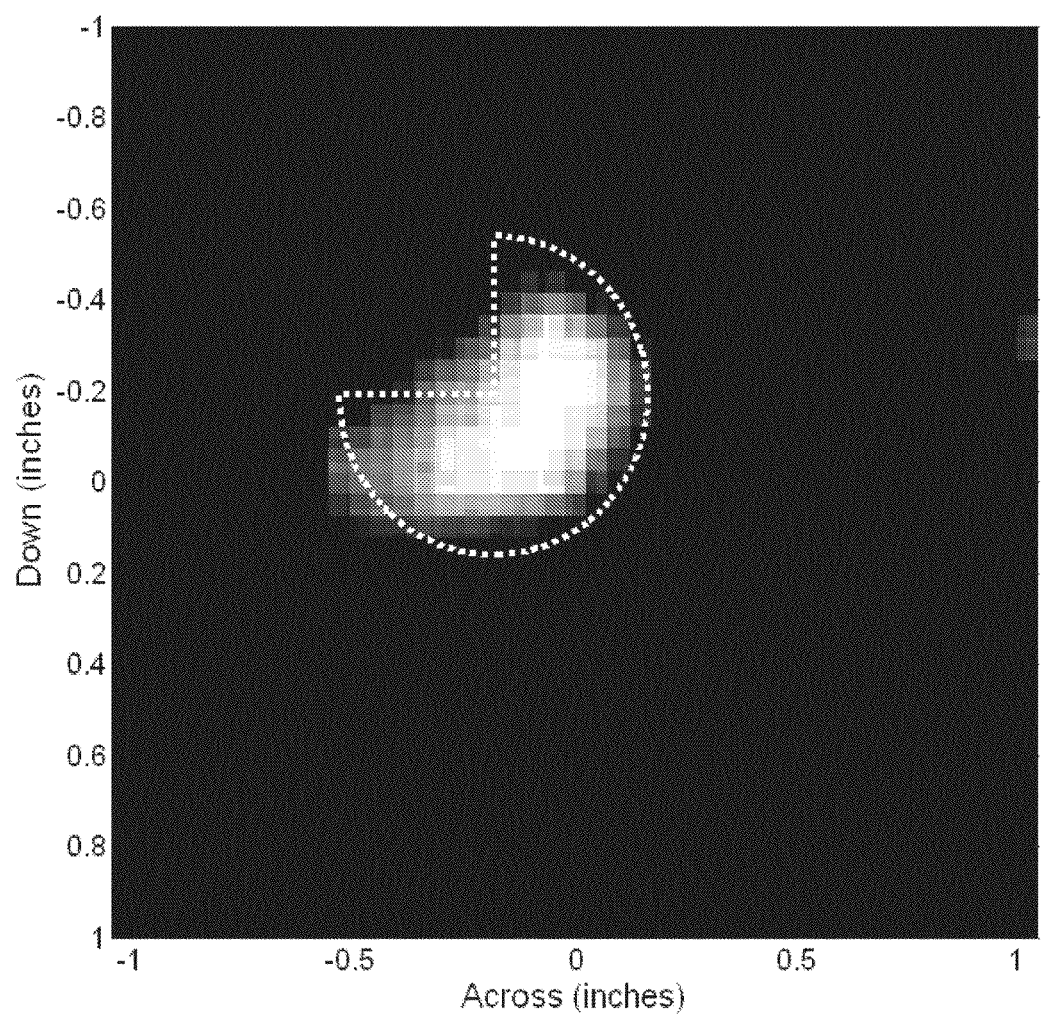

The previously discussed examples utilized the single lens imager setup shown in FIG. 4, which was used for proof-of-principle testing of compressive sensing. In order to extend the principles of the present invention to far field imaging, a two-lens compressive sensing setup as shown in FIG. 3 was utilized. In the examples tested, to ensure high thermal contrast under indoors, a 60 W incandescent lamp (thermal source) was used as the target to be imaged. In outdoor conditions, however, such an artificial hot or cold source is not needed as the cold sky reflected radiation would offer an excellent thermal contrast. FIG. 10(a) gives the reconstructed images of the lamp, and FIG. 10(b) gives that with one quarter of the lamp blocked by a metal plate. Although the reconstruction in this example used a full set of acquisitions, partial acquisitions should be adequate for far-field imaging as shown by earlier images for the single lens setup.

CONCLUSIONS

The above examples illustrate embodiments of the present invention relating to a compressive sensing approach for single-pixel passive millimeter wave imaging with potential for reducing image acquisition time by a factor of 10 or more. It is based on a Hadamard transform mask for spatial intensity modulation, and allows for fast real-time image reconstruction as it involves the quickly converging relaxation numerical method and simple matrix manipulations. In one exemplary embodiment, a Hadamard mask of 41×43 pixels, with pixel size of 1.24 mm, about half the wavelength of the utilized 146 GHz to 154 GHz bandwidth radiometer was used. To introduce different Hadamard masks in the MMW beam path for compressive sensing, an extended cyclic Hadamard mask of 81×85 pixels may be used. A t-axis translational stage may be used to expose different submask of size 41×43 from the extended mask. An incandescent lamp of brightness temperature 475K was used as an illumination thermal source for indoor imaging. An imaging object was placed behind the mask. The STN ratios of radiometer signals for lamp radiation without and with the Hadamard mask in the beam path were 13.2 and 7.9, respectively; the degradation is not severe considering subwavelength size pixels used in the mask.

Images were first reconstructed from a full set (1763) of Hadamard acquisitions. The Hadamard transform process was also simulated by binary coding of the object, generating Hadamard transformed data, and reconstructing the object image from the data. The agreement between the simulated and measured Hadamard transform images was very good, validating the effectiveness of the CS imager. An iterative relaxation method may be used, as shown in the examples, for image reconstruction from partial Hadamard acquisitions. The Hadamard space is efficiently extrapolated by the numerical relaxation procedure and the image reconstruction then uses standard (full set) Hadamard inversion. The reconstructed image of the object compared well in quality with the original image with as little as 11% of the full samples. As illustrated in the examples, the relaxation method was extended to implement a progressive sampling scheme in LabVIEW® with real time reconstruction and image display. The image is reconstructed and displayed after each Hadamard acquisition; the acquisitions may continue until satisfactory image quality is obtained. Most test cases resulted in good quality images with about 10 percent of the acquisitions, thus offering a factor-of-ten increase in imaging speed by adapting the CS approach.

Figure 11:
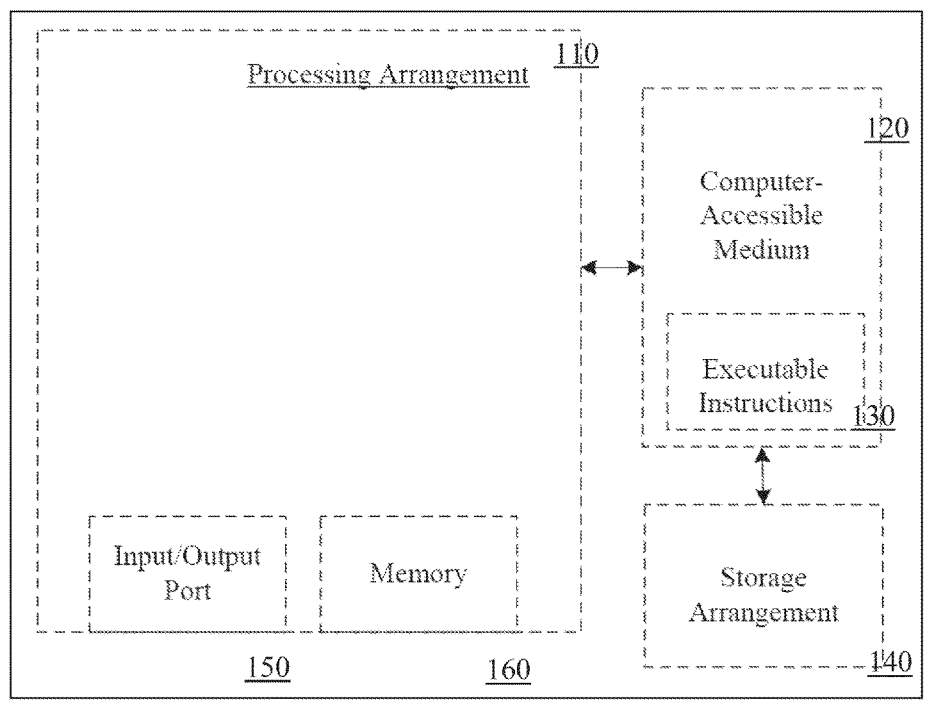
FIG. 11 illustrates one embodiment of a computerized system for implementing the PMMW imaging with compressive scanning described herein.

In one embodiment, shown in FIG. 11, a system 100 is provided for implementing the methods described herein. FIG. 11 shows an exemplary block diagram of an exemplary embodiment of a system 100 according to the present disclosure. For example, an exemplary procedure in accordance with the present disclosure can be performed by a processing arrangement 110 and/or a computing arrangement 110. Such processing/computing arrangement 110 can be, e.g., entirely or a part of, or include, but not limited to, a computer/processor that can include, e.g., one or more microprocessors, and use instructions stored on a computer-accessible medium (e.g., RAM, ROM, hard drive, or other storage device).

As shown in FIG. 11, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for millimeter-wave imaging comprising:
   positioning a portion of an extended Hadamard mask within an opening of a template with an opening of size p×q, the extended Hadamard mask having a size (2p−1)×(2q−1) wherein p and q are prime numbers, the Hadamard mask receiving millimeter waves from a source;
   transmitting a portion of the millimeter waves through transmit pixels in the Hadamard mask;
   reflecting a portion of the millimeter waves by reflect pixels in the Hadamard mask;
   focusing the transmitted portion of the millimeter waves; and
   receiving the focused millimeter waves at a detector.

2. The method of claim 1, wherein pixel size is s>λ/2 where λ is the wavelength of the received millimeter waves.

3. The method of claim 1, further comprising imaging an object through an imaging lens, wherein an image plane is projected.

4. The method of claim 3, wherein the extended Hadamard mask is positioned at the image plane.

5. The method of claim 4, wherein the portion of the Hadamard mask is at least 40 pixels by 40 pixels.

6. The method of claim 1, further comprising the application of a relaxation technique to reconstruct the image.

7. The method of claim 6, wherein the image is reconstructed according to $$I_s = S^{-1} I_m = \frac{2}{pq+1}(2S^T - J)I_m$$

where J is an all-one matrix.

8. The method of claim 1, wherein q=p+2.

9. A system for passive millimeter wave imaging a source comprising:
   an extended Hadamard mask comprising a plurality of pixels, the pixels including transmitting pixels and non-transmitting pixels, the transmitting pixels allowing millimeter waves to pass through;
   a template with an opening smaller than the extended Hadamard mask, the template positioned between the source and the extended Hadamard mask
   a focusing lens positioned behind the extended Hadamard mask relative to the source and positioned to receive millimeter waves from the extended Hadamard mask;
   a receiving antenna associated with the focusing lens to receive millimeter waves; and
   a radiometer in communication with the receiving antenna.

10. The system of claim 9, further comprising an imaging lens positioned between the source and the extended Hadamard mask.

11. The system of claim 10, wherein the extended Hadamard mask is positioned at the imaging lens' image plane.

12. The system of claim 9, further comprising a 2-axis stage in communication with the extended Hadamard mask.

13. The system of claim 9, wherein the extended Hadamard mask has a size (2p−1)×(2q−1) and the template opening has a size p×q.

14. The system of claim 13, wherein p and q are prime numbers.

15. The system of claim 9 wherein pixel size is s>λ/2 where λ is the wavelength of the millimeter waves.

16. A computer-implemented machine for imaging an object, comprising:
   a processor; and
   a tangible computer-readable medium operatively connected to the processor and including computer code configured to control:
   imaging an object via an imaging lens at an image plane;
   positioning a Hadamard mask at the image plane;
   interacting millimeter waves from the object with the Hadamark mask;
   transmitting a portion of the millimeter waves through transmit pixels in the Hadamark mask;
   focusing the transmitted portion of the millimeter waves; and
   receiving the focused millimeter waves.

17. The computer-implemented machine of claim 16, wherein the positioning of the Hadamard mask comprises selecting a Hadamard mask.

18. The computer-implemented machine of claim 17, wherein selecting the Hadamard mask comprises selecting an area of size p×q from an extended Hadamard mask of size (2p−1)×(2q−1).

19. The computer-implemented machine of claim 18, further comprising selecting a subset of the pixels starting at every nth pixel of the extended Hadamard mask, where n is greater than 1.

20. The computer implemented machine of claim 16, further including computer code configured to control the application of a relaxation technique to reconstruct the image.

* * * * *